(No Model.) 2 Sheets—Sheet 1.
W. H. H. KNIGHT.
OPERA CHAIR.
No. 276,830. Patented May 1, 1883.
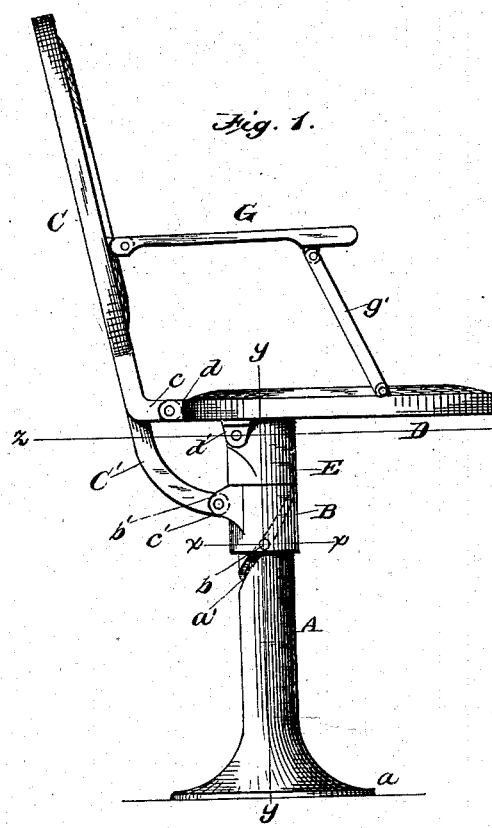
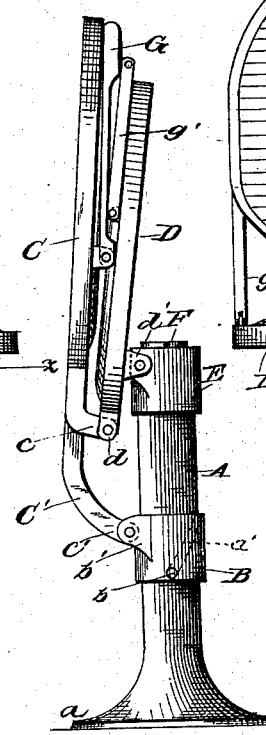
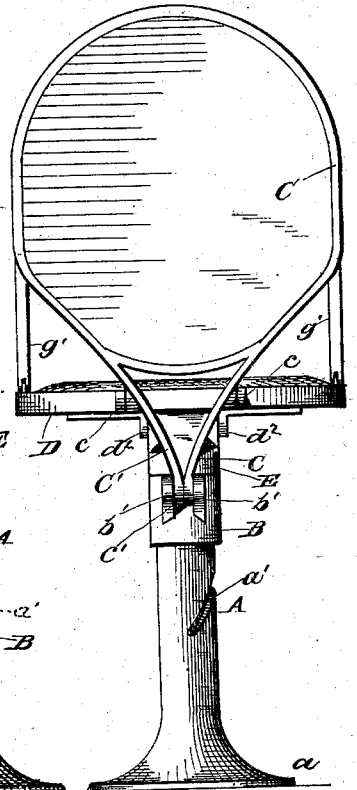
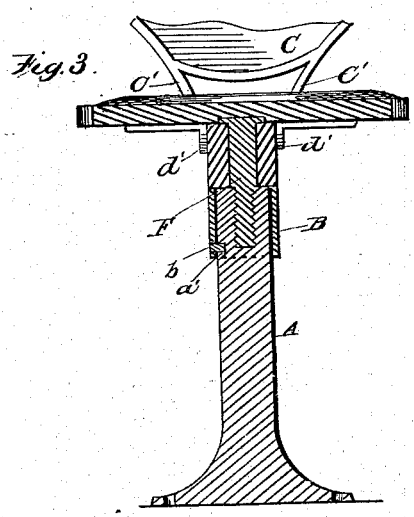
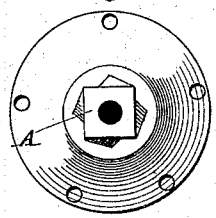
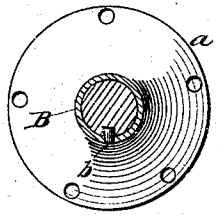
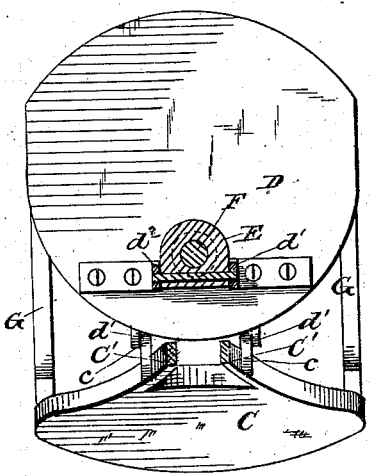
WITNESSES:
INVENTOR
W. H. H. Knight
Attorney
N. PETERS, Photo-Lithographer, Washington, D. C.

(No Model.) 2 Sheets—Sheet 2.

W. H. H. KNIGHT.
OPERA CHAIR.

No. 276,830. Patented May 1, 1883.

WITNESSES:
Wm. Duvall
Cornelia Abrams

INVENTOR
W. H. H. Knight

Attorney.

UNITED STATES PATENT OFFICE.

WILLIAM H. H. KNIGHT, OF WASHINGTON, DISTRICT OF COLUMBIA, ASSIGNOR OF ONE-HALF TO GEORGE B. ABRAMS, OF SAME PLACE.

OPERA-CHAIR.

SPECIFICATION forming part of Letters Patent No. 276,830, dated May 1, 1883.

Application filed March 6, 1883. (No model.)

*To all whom it may concern:*

Be it known that I, WILLIAM H. H. KNIGHT, a citizen of the United States, residing at Washington, in the District of Columbia, have invented a new and useful Improvement in Opera-Chairs, of which the following is a specification.

My invention consists in an opera-chair the seat and back of which are adapted to be folded together, and while being so folded to be rotated a quarter-turn upon a standard; and to the accomplishment of this purpose it consists in the construction, combination, and operation of the various parts, as shown in the accompanying drawings and hereinafter described and claimed.

Figure 11:
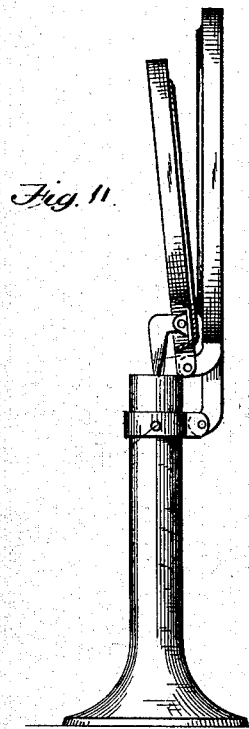
Figure 10:
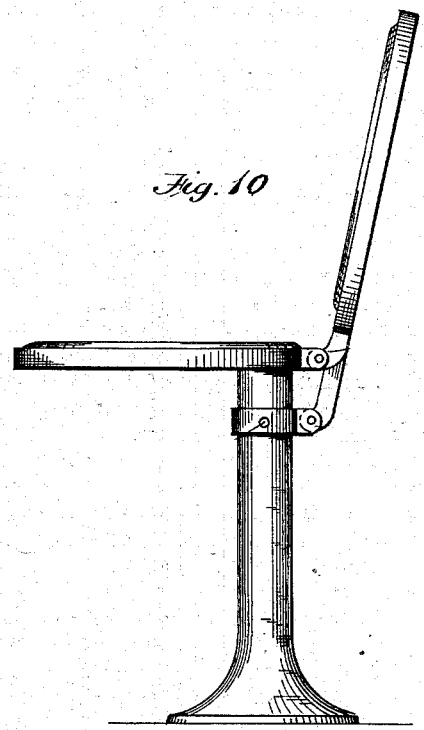
Figure 12:
Figure 14:
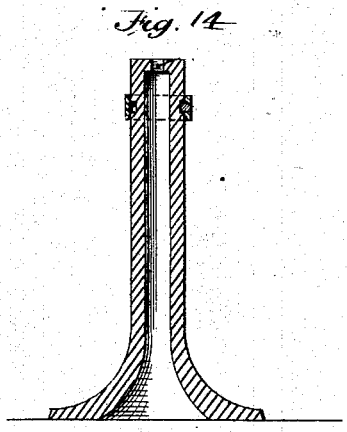
Figure 13:
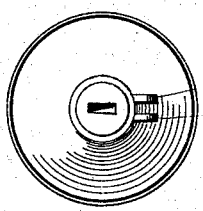

Referring to the accompanying drawings, in which similar letters of reference indicate like parts, Figure 1 represents a side elevation of my improved chair open in position to be used. Fig. 2 represents a side elevation thereof closed. Fig. 3 represents a vertical section on line $yy$, Fig. 1. Fig. 4 represents a transverse section on line $xx$, Fig. 1. Fig. 5 represents a sectional view on line $zz$, Fig. 1, looking up toward the bottom of the seat. Fig. 6 represents a rear view of the chair-back. Figs. 7 to 14, inclusive, represent modified forms of the turning device.

In the drawings, A represents a standard provided at its lower end with a flaring base, $a$, whereby to attach it to the floor. The standard A is provided with a spiral slot or groove, $a'$, into which projects a pin, $b$, extending inwardly from a sleeve, B, placed upon and adapted to slide up and down the standard, as shown. The sleeve B is provided upon one side with two rearwardly-projecting ears, $b'$, between which is pivoted the lower end of downwardly-projecting arms C', attached to the back-frame C.

$c'$ represents lugs projecting forward from the lower portion of frame C, said lugs being pivoted to ears $d$ upon the rear side of the seat-frame D. The seat-frame D is provided upon its lower surface with downwardly-projecting lugs $d'$, pivoted to one side of a rotating sleeve, E, placed upon the head of the standard A.

The sleeve E is held in position upon the standard by a stud or bolt, F, screw-threaded at its lower end, which projects downward through said sleeve and into a screw-threaded aperture in the head of the standard A, as shown.

G represents arm-rests pivoted to the back of the chair at $g$, said arms being connected near their forward ends to the seat B by pivoted links $g'$.

In lieu of having the spiral slot $a'$ in the standard and the pin $b$ in the sliding sleeve B, said slot may be placed on the inner surface of the sleeve, in which case the pin $b$ will project from the standard, as shown in Figs. 8 and 9; or the standard itself may be quadrangular in cross-section, and have a quarter-turn from top to bottom, and provided with a sleeve quadrangular on its inner surface, as shown in Fig. 7.

In Sheet 2 of the drawings I have shown an additional modification, consisting of a flat bar having a quarter-twist, and pivoted at its upper end to the bottom of the seat, said bar passing through a rectangular opening in the top of the standard when the seat is raised or lowered against or from the back, said twisted bar and rectangular opening operating to rotate the seat and back when being opened from or closed toward each other. When this construction is employed the lower end of the back-frame is attached to a sleeve held in one position as regards vertical movement upon the standard, but having rotary movement about said standard.

I do not limit myself to the particular construction shown and described in this specification and its attached drawings, as the result sought and attained by such construction—i. e., the automatic turning of the back and seat by the raising of the latter—may be accomplished in various ways not shown therein, each and all of which are within the scope of my invention, that invention being to provide a chair having automatic rotary motion imparted to its back and seat when the latter is raised.

It will readily be seen from the above description that my invention as described will have advantages not heretofore possessed by any folding chair, among which is that the act of raising the seat operates to give both the seat and back a quarter-turn upon the standard and holds said seat and back against being turned backward or swinging around without first lowering the seat; and also when the seat is turned down said seat is by the same means prevented from rotating upon the standard until it is again raised. The sleeve sliding downward upon the standard and being by the spiral groove rotated, operating to turn both back and seat, as above stated, and when in an auditorium provided with chairs constructed in accordance with my invention said chairs are turned, as above described, a series of aisles radial or at right angles to the stage or proscenium will be formed, thus admitting of easy and rapid exit of an audience, and at the same time affording larger seating capacity in respect to floor-space than can be secured in any form of chair now in use.

What I claim is—

1. In a folding chair, a supporting-standard, a device attached to said standard capable of rotating freely on the same, a seat hinged to said device, and means, substantially as decribed, connected to the seat, whereby the upward folding of the seat will rotate the same one-quarter of a revolution, as and for the purpose set forth.

2. In a folding chair, the combination of a supporting-standard, a device attached to said standard capable of rotating freely independent of the same, a seat hinged to said device, a back hinged to said seat, and means, substantially as described, connected directly or indirectly with the seat, whereby the upward folding of the seat will cause said seat and back to revolve a quarter-revolution upon the standard, as and for the purpose set forth.

3. In a folding chair, the standard A, provided with a spiral groove, a, a device attached to the standard capable of rotating independently of the same, a seat hinged to said device, and a back hinged to the seat, in combination with a sleeve upon the standard, provided with a projection to engage the groove a, and the connection between the back and sleeve, as and for the purpose set forth.

4. In a folding chair, the standard A, provided with the spiral groove a, a device attached to said standard capable of rotating independently of the same, a seat hinged to said device and provided with arm-rests, and a back hinged to said seat, in combination with a sleeve upon the standard, provided with a projection to engage the groove a, and the connection between the back and sleeve, as and for the purpose set forth.

5. In a folding chair, a supporting-standard, a block connected thereto, as described, whereby it may rotate independently of the same, a seat hinged to said block, and a back hinged to said seat, in combination with a sleeve upon the standard, provided with a projection to engage the groove a in the standard, and the connection between the back and sleeve, as and for the purpose set forth.

6. In a folding chair, a supporting-standard provided with a spiral groove, as set forth, a device attached to the standard capable of rotating independently of the same, a seat hinged to said device a short distance in front of its rear edge, and a back hinged to the rear edge of the seat, in combination with a sleeve upon the standard, having a projection to engage the spiral groove a, and an arm rigidly connected with the back, extending downward below the same and hinged to the sleeve upon the standard, substantially as and for the purpose set forth.

W. H. H. KNIGHT.

Witnesses:
S. H. JACOBSON,
GEO. FRS. DAWSON.